June 30, 1925.

E. K. WILLARD 1,543,892

MOTION PICTURE PROJECTOR APPARATUS

Filed Feb. 2, 1923 4 Sheets-Sheet 1

June 30, 1925.
E. K. WILLARD
MOTION PICTURE PROJECTOR APPARATUS
Filed Feb. 2, 1923
1,543,892
4 Sheets-Sheet 3
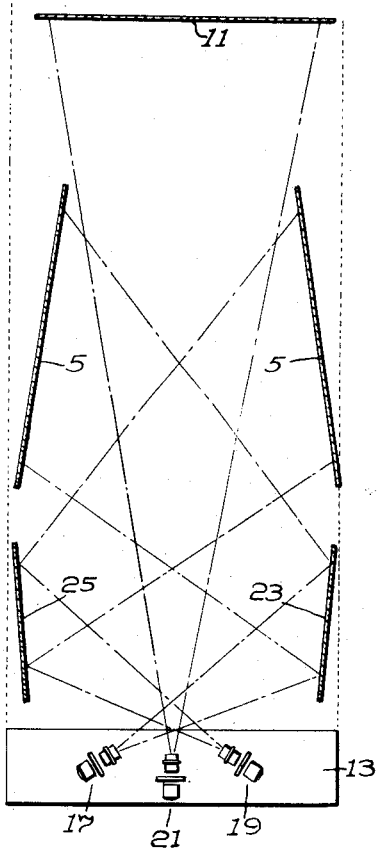
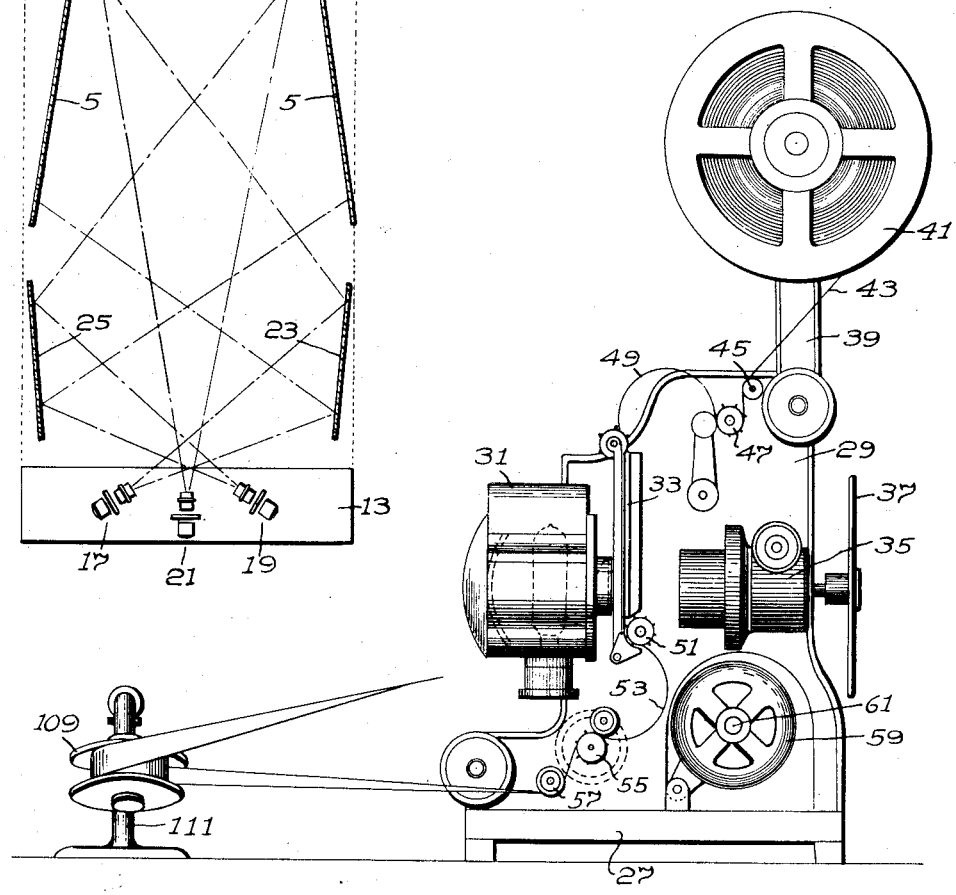
INVENTOR:
Eugene King Willard
BY Henry T. Williams,
ATTORNEY

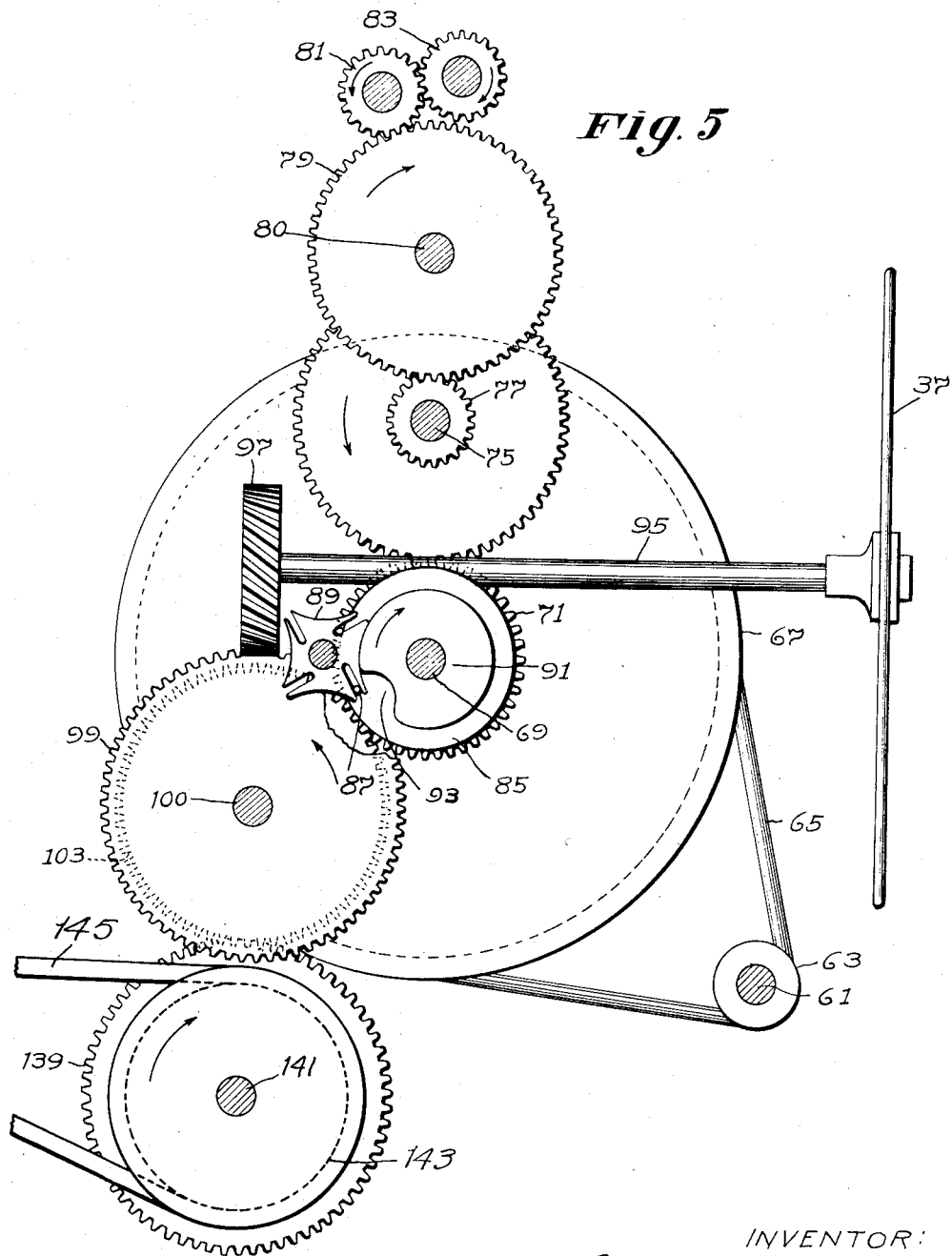

Patented June 30, 1925.

1,543,892

UNITED STATES PATENT OFFICE.

EUGENE KING WILLARD, OF BOSTON, MASSACHUSETTS.

MOTION-PICTURE-PROJECTOR APPARATUS.

Application filed February 2, 1923. Serial No. 616,607.

*To all whom it may concern:*

Be it known that I, EUGENE KING WILLARD, a citizen of the United States, residing at Boston, in the county of Suffolk and State of Massachusetts, have invented certain new and useful Improvements in Motion-Picture-Projector Apparatus, of which the following is a specification.

The invention to be hereinafter described relates to motion picture apparatus, and more particularly to such apparatus adapted for advertising purposes.

In order that the advertised matter may reach a large number of people, the apparatus may be mounted desirably in a motor truck or other vehicle body which may be provided with a plurality of screens, for example, at the sides and rear end of the body. Three projectors may be mounted in the body adjacent the front end thereof, and may be arranged to throw images on the side and rear screens respectively.

It is desirable that the projectors shall throw the same pictures or images on the three screens. A purpose of the present invention, therefore, is to provide means for feeding the same film progressively through the three projectors.

Each projector is provided with an electric motor for driving the mechanism for feeding the film therethrough, and therefore, the film is fed at three different driving points. These electric motors necessarily are susceptible of speed variation tendencies, even though regulated with the intention of producing the same speed of rotation. Differences in the speeds of the motors would necessarily subject the film to strains which would be liable to tear or otherwise injure the film and prevent proper feed thereof toward the gates of the projectors. Another purpose of the present invention, therefore, is to provide means for equalizing the speed of feed of the film at the three driving points, so that the film will be fed properly through the projectors and without injury thereto.

The three projectors, in the present instance of the invention, are disposed side-by-side. The central projector is adapted to throw images on the rear screen, and the side projectors are adapted to throw images on the side screens. The distance of the rear screen from the central projector is necessarily greater than the distance of the side screens from the side projectors, owing to the oblong shape of the vehicle body. Therefore, it is desirable to extend the path of light between the side projectors and their screens, in order that the images thrown on the three screens may be of substantially the same size. Another purpose of the invention, therefore, is to dispose the side projectors at an angle with respect to each other, and to provide reflectors for reflecting the images to the side screens.

The pictures or images thrown on the screens are viewed by observers externally of the truck body. Therefore, the pictures or images thrown on the rear screen appear reversed. For example, reading matter would appear so as to read from right to left, instead of from left to right as would be the case if the screen were viewed by an observer within the truck body. To compensate for this and cause the images to appear properly from the exterior of the body, the film fed through the central projector is reversed edge-for-edge in respect to the usual method.

To cause the images on the side screens to appear properly from the exterior of the body, the film is fed through the projectors in the usual manner, but the images are corrected by the reflectors which reverse the images. Since the same film passes progressively through the three projectors, but its position edge-for-edge in the central projector is reversed in respect to its position in the side projectors, suitable means is provided to reverse the film as it passes from one side projector to the central projector and again to reverse the film as it passes from the central projector to the other side projector.

With the aforesaid and other purposes in view, the character of the invention may be best understood by reference to the following description of one good form thereof shown in the accompanying drawings, wherein:

Fig. 3 is a diagrammatic plan showing the relation of the projectors, reflectors and screens;

Fig. 4 on an enlarged scale is a side elevation of one of the projectors; and

Fig. 5 is a side elevation of the driving train of gears in one of the projectors.

Figure 1:
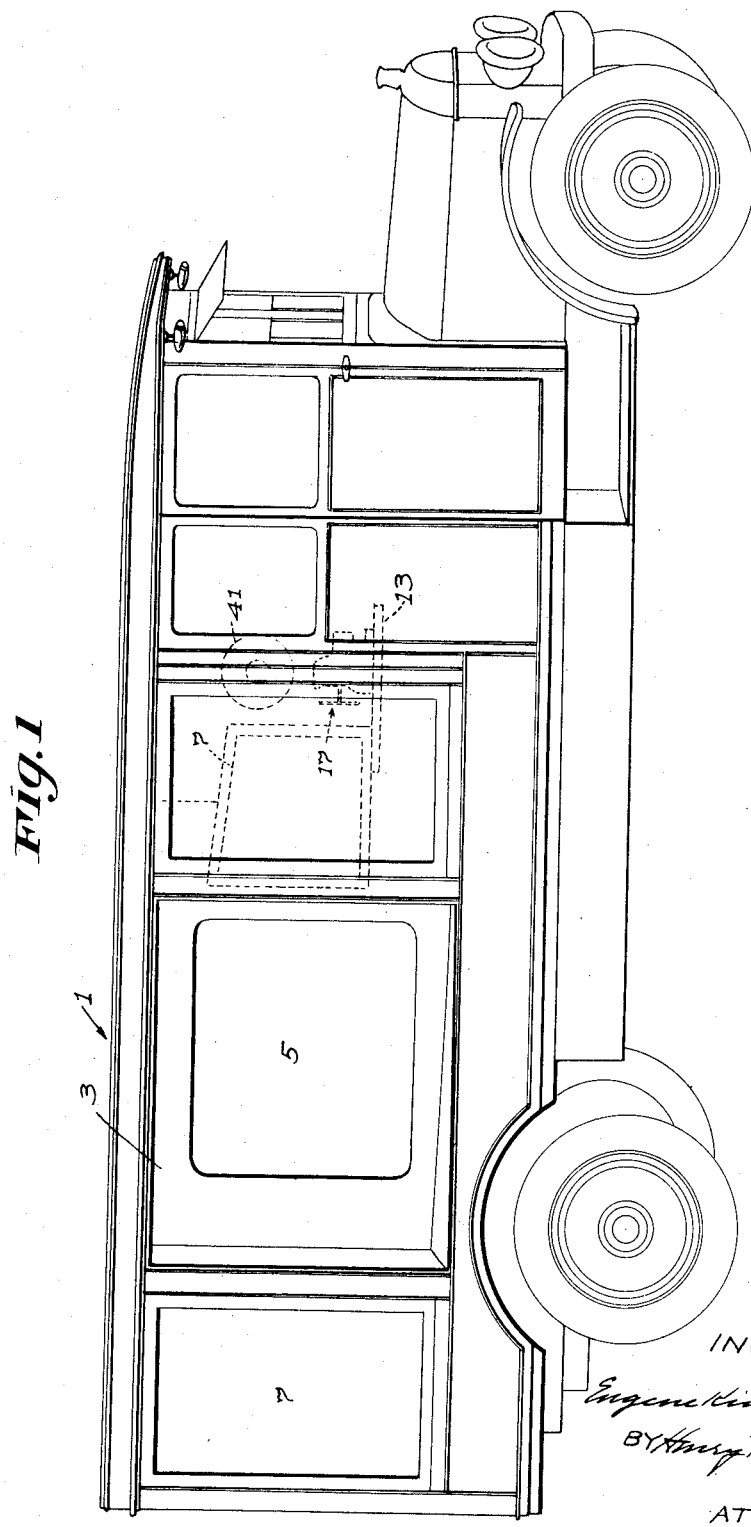
Fig. 1 is a side elevation of a motor truck having a body equipped with motion picture projector apparatus embodying the invention.

Referring to the drawings, and more particularly to Fig. 1, a motor truck is shown therein provided with a body 1 specially constructed for motion picture purposes. This body has on each side thereof, a panel 3 provided with a screen 5 of ground glass or other suitable material. At opposite sides of the screen 5 are panels 7 adapted for displaying illuminated pictures or other advertising matter, said panels being desirably of the construction disclosed in my copending application Serial No. 625,907 filed March 17, 1923, but since these panels form no part of the present invention, it is unnecessary to show and describe the same in detail herein. At the rear end of the truck is a panel 9 (Fig. 2) having a screen 11 mounted therein of ground glass or other suitable material.

Mounted within the truck adjacent the front end thereof is a table 13 extending the width of the truck and mounted on tracks 15 enabling adjustment of the table longitudinally of the truck body if desired.

Mounted on the table are three motion picture projectors including side projectors 17 and 19, and a projector 21 intermediate the side projectors. The side projectors are disposed at an angle to each other, and throw their light streams in crossing relation to project images on the side screens 5. The intermediate projector throws its light stream directly to and projects its image on the rear end screen 11.

The distance from the central projector to the rear end screen is greater than the distance from the side projectors to the side screens, owing to the oblong shape of the body. Therefore, it is desirable to reflect the images from the side projectors to the side screens, in order that the images appearing on the three screens may be of substantially the same size. In the present instance of the invention, the side projector 17 throws its images on a reflector 23 mounted at the side of the truck remote from the projector, said reflector being in a position properly to reflect the images to the side screen opposite thereto. The projector 19 throws its images on a reflector 25 mounted at the side of the truck remote from the projector, said reflector being in a position properly to reflect the images to the side screen opposite thereto. The construction is such that the length of the light paths between the three projectors and their screens may be substantially the same.

Each of the projectors comprises a base 27 (Figs. 2 and 4), on which is mounted an upright 29 carrying the usual lamp house 31, gate 33, focusing tube 35 and rotary apertured shutter 37.

Rising from the upright 29 is an arm 39 supporting the let-off reel 41 carrying the film 43. The film passes downwardly over an idler wheel 45 about a sprocket wheel 47 having teeth adapted to project through holes in a margin in the film, thereby positively to feed the same. The film passes thence in the form of a free loop down through the gate 33, and about a sprocket wheel 51 having teeth adapted to project into the marginal holes of the film, said sprocket wheel being driven step-by-step by means to be described. The film passes thence in the form of a free loop 53 about a sprocket wheel 55 having teeth adapted to project through the marginal holes in the film. The film passes thence about an idler wheel 57, and thence out from the projector.

To feed the film through the projector, an electric motor 59 is provided having a shaft 61 on which is mounted a pulley 63 connected by a belt 65 with a fly wheel pulley 67 on a shaft 69. Fast on the shaft 69 (Fig. 5) is a gear 71 meshing with a larger gear 73 fast on a shaft 75. Also fast on said shaft is a pinion 77 meshing with a gear 79 on a shaft 80. The gear 79 meshes with a pinion 81 for driving a gear 83 fast on the shaft carrying the sprocket wheel 47 referred to. The construction is such that the sprocket wheel 47 is continuously rotated to positively draw the film from the let-off reel 41.

To rotate the sprocket wheel 51 step-by-step to draw the film through the gate 33, a wheel 85 is mounted fast on the motor driven shaft 69, and has a pin 87 thereon cooperating with a Geneva gear 89 fast on the shaft carrying the sprocket wheel 51. A disk 91 on the shaft 69 has a recess 93 to admit the points of the Geneva gear during the turning of the latter by the pin 87, and the periphery of the wheel 91 fits with curved portions of the points of the Geneva gear to prevent rotation of the latter, excepting when turned steps by the pin 87.

To rotate the shutter 37 referred to, the shaft 95 for the shutter, is provided with a spiral gear 97 driven by a spiral gear 99 on a shaft 101. A gear 103 on the shaft 101 meshes with and is driven by a motor driven gear 85. The construction is such that the shutter is rotated to obstruct the stream of light issuing from the projector while the Geneva gear is serving to advance the film a step through the gate.

The film is fed progressively through the projectors, in order that the same images may be thrown on the three screens. The film on leaving the projector 17 is guided about a roller 109 (Figs. 1 and 4) on a bracket 111 mounted on the table 13. The film passes upwardly and obliquely toward the intermediate projector 21, and is guided over a roller 113 on a standard 115 mounted on the table 13. In the course of the transit of the film from the guide roller 109 to the guide roller 113, it is reversed or twisted edge-for-edge. The film extends from the roller 113 over a guide roller 117 on an arm 119 rising from the upright of the projector 21, said roller 117 being substituted for the usual let-off reel. The film passes from the guide roller 117 downward through the intermediate projector, and as it emerges therefrom, it passes about a guide roller 121 on a bracket 123 mounted on the table. The film extends thence upwardly and obliquely to a guide roller 125 on a standard 127 mounted on the table. The film in its transit from the guide roller 121 to the guide roller 125, is reversed or twisted edge-for-edge. The film passes from the guide roller 125 over a guide roller 129 on an arm 131 rising from the upright of the projector 19, said guide roller 129 being substituted for the usual let-off reel.

The film extends from the roller 129 downward through the projector, and is wound on a take-up reel 133 on a shaft 135 mounted on an arm 137 mounted on the base of the projector 19. The gear 103 referred to for the projector 19, meshes with a gear 139 (Fig. 5) on a shaft 141, and a pulley 143 on said shaft is connected by a belt 145 (Fig. 2) with a pulley 147 on the shaft 135 for the take-up reel.

It will be noted that each of the projectors has its own electric motor for driving the train of gearing thereof. These motors are necessarily susceptible to speed variation tendencies, although regulated with the intention of furnishing the same speed of rotation. Since the film is fed progressively through the three projectors, it is necessary that the gear trains thereof shall be rotated at the same speed, in order that the film may not be subjected to undue strains or ruptured. Accordingly, means is provided to caused these gear trains to feed the film at the same speed at the three projectors.

This means, in the present instance of the invention, comprises an extension 149 of the shaft 80 referred to, of the gear train, said extension being connected by a universal joint 151 to one end of a connecting shaft 153, the opposite end of said shaft being connected by a universal joint 155 with an extension 157 with the shaft 80 of the gear train of the central projector 21.

The shaft 80 of the central projector has an extension 159 connected by a universal joint 161 with one end of a connecting shaft 163, the opposite end of which is connected by a universal joint 165 with an extension 167 of the shaft 80 for the projector 19.

The construction is such that the driving trains of the three projectors are connected to cause the same to rotate in unison irrespective of speed variation tendencies of the driving motors for the individual gear trains, and thus the film is properly fed at the three projectors without any liability of straining, rupturing or breaking the film.

Figure 2:
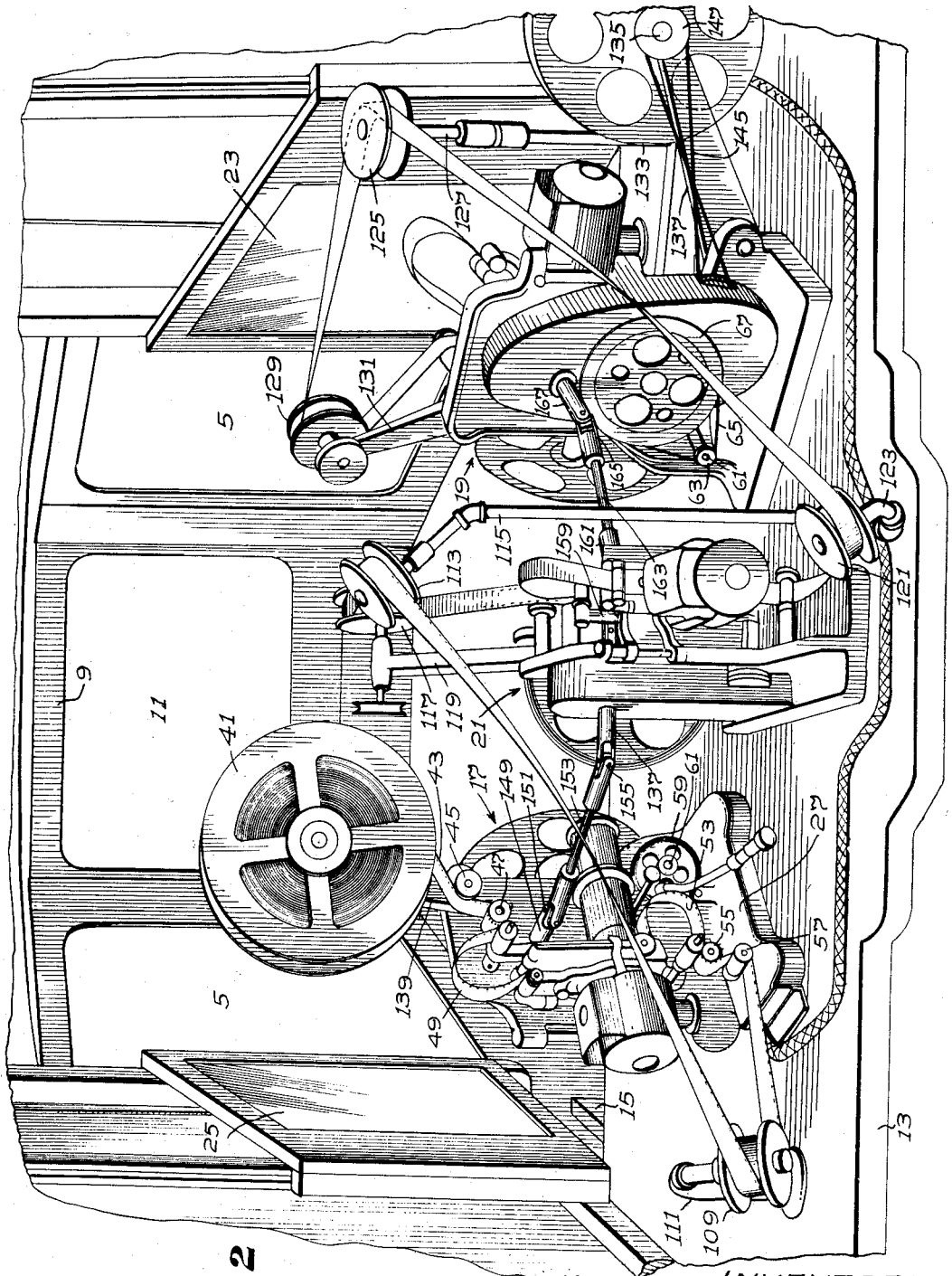
Fig. 2 is a perspective view of the apparatus as it appears when looking from the front toward the rear end of the body.

In order that the pictures or images thrown on the rear screen may appear properly when viewed from the exterior of the truck, the film for the central projector is reversed or turned edge-for-edge, and this makes it necessary to provide sprocket wheels such as the sprocket wheels 47, 51 and 55 refererd to, having teeth positioned to project into the marginal holes adjacent the left edge of the film (Fig. 2).

The images from the film fed through the side projectors, are reversed by the reflectors which correct the images and cause the same to appear properly on the side screens when viewed from the exterior thereof. For example, reading matter will appear on the screens so as to be read from left to right.

As stated, the film is reversed in its transit from the left projector to the central projector, and again is reversed in its transit from the central projector to the right projector, thereby causing the film when passing through the central projector to be reversed edge-for-edge in respect to its positions when passing through the side projectors.

The general relation of the projectors, screens and reflectors is diagrammatically shown in Fig. 3, from which it will be noted that the side screens 5 are disposed at an angle with respect to the sides of the truck body, in order that the light rays passing from the reflectors may be more nearly normal to the screens 5 than if the latter were parallel to the sides of the truck body. The consequence is that any substantial distortion of the images thrown on the side screens is prevented.

By my invention, efficient motion picture projector apparatus is provided for throwing images progressively on a plurality of screens. In the present instance, the images are thrown on three screens, and may be viewed exteriorly of the body in which the screens are mounted.

When the body is mounted on a truck which may pass through the streets, matter thrown on the screen will reach many people, and thus will serve very desirably for advertising purposes.

While the apparatus is shown herein as mounted on a motor vehicle, it will be understood that it may be otherwise mounted and employed for other purposes. For example, it might be employed in a store window, so that the side screens would be visible to persons approaching the store in opposite directions, and the intermediate screen would be visible to persons standing opposite to the store.

It will be understood that the invention is not limited to the specific embodiment shown, and that various deviations may be made therefrom without departing from the spirit and scope of the appended claims.

What is claimed is:—

1. Apparatus of the character described comprising, in combination, a plurality of screens, projectors for throwing images on the screens respectively, each of said projectors having film feeding mechanism, means for guiding the film from projector to projector; shafts, and universal joints connecting the shafts with the feeding mechanism of the projectors for causing the latter to feed the film at the projectors in synchronism.

2. Apparatus of the character described comprising, in combination, a plurality of screens, projectors for throwing images on the screens, each of said projectors having an electric motor, and means driven by the motor for feeding a film through the projector; means for guiding the film from one projector to another, and means for causing the film feeding means to advance the film at the same speed irrespective of speed variation tendencies of said motors.

3. Apparatus of the character described comprising, in combination, a pair of side screens, an end screen, motion picture projectors including a pair of side projectors, one for throwing an image on one of the side screens and the other for throwing an image on the other side screen, a projector between the side projectors for throwing an image on the end screen; and means for feeding a film progressively through the projectors including an electric motor for each of the projectors and means for equalizing the speed of the motors.

EUGENE KING WILLARD.